United States Patent [19]
Fuerstenau et al.

[11] Patent Number: 5,609,527
[45] Date of Patent: Mar. 11, 1997

[54] CONSTANT VELOCITY UNIVERSAL JOINT HAVING AN IMPROVED CAGE DESIGN

[75] Inventors: Charles Fuerstenau, Porto Alegre, Brazil; Herbert Konegen, Rösrath, Germany; Wolfgang Hildebrandt, Siegburg, Germany; Peter Seigert, Lohmar, Germany

[73] Assignee: GKN Automotive AG, Germany

[21] Appl. No.: 288,344

[22] Filed: Aug. 10, 1994

[30] Foreign Application Priority Data

Aug. 12, 1993 [DE] Germany .......................... 43 27 016.6

[51] Int. Cl.⁶ ............................................ F16D 3/224
[52] U.S. Cl. ................................... 464/145; 464/906
[58] Field of Search ............................. 464/141, 143, 464/145, 906

[56] References Cited

U.S. PATENT DOCUMENTS

| | | |
|---|---|---|
| 1,395,607 | 11/1921 | Sorensen . |
| 1,677,841 | 7/1928 | Nice . |
| 1,827,789 | 10/1931 | Hutto . |
| 2,838,919 | 6/1958 | Cull ........................ 464/145 |
| 3,412,580 | 11/1968 | Cull ........................ 464/145 |
| 4,020,650 | 5/1977 | Krude .................... 464/906 X |
| 4,023,382 | 5/1977 | Welschof ............... 464/906 X |
| 4,846,764 | 7/1989 | Hazelbrook et al. . |
| 4,942,652 | 7/1990 | Hazelbrook et al. . |
| 5,221,233 | 6/1993 | Jacob ..................... 464/145 |

FOREIGN PATENT DOCUMENTS

| | | | |
|---|---|---|---|
| 2556608 | 7/1976 | Germany | 464/145 |
| 62-194028 | 8/1987 | Japan | 464/906 |
| 5-257547 | 10/1993 | Japan | 464/145 |
| 978230 | 12/1964 | United Kingdom . | |
| 1141798 | 1/1969 | United Kingdom | 464/145 |

*Primary Examiner*—Daniel P. Stodola
*Assistant Examiner*—Eileen . A. Dunn
*Attorney, Agent, or Firm*—Harness, Dickey & Pierce PLC

[57] ABSTRACT

A cage for a constant velocity universal joint has an increase in the fracture strength of the cage and thus the torque capacity of the entire constant velocity universal joint. This is achieved in that the apertures for the windows in the cage at the circumferentially extending contact faces do not extend parallel to the central axis but contact a virtual sphere arranged at the point of intersection between the radial center plane of the cage and the joint axis. As a result, the webs of the cage comprise a larger cross-section and in consequence, its fracture strength is improved.

1 Claim, 3 Drawing Sheets

CONSTANT VELOCITY UNIVERSAL JOINT HAVING AN IMPROVED CAGE DESIGN

FIELD OF THE INVENTION

The present invention relates to constant velocity joints. More particularly, the present invention relates to an improved cage design for a constant velocity universal joint.

SUMMARY OF THE INVENTION

The invention relates to a constant velocity universal joint having a bell-shaped outer joint part comprising a hollow space and provided with uniformly distributed outer running grooves; and an inner joint part provided with inner running grooves corresponding to the outer running grooves and with torque transmitting balls which are received in the inner and outer running grooves and which are held in the windows of a cage arranged between the outer joint part and inner joint part.

BACKGROUND OF THE INVENTION

The fracture strength of constant velocity universal joints in the case of which torque is transmitted by balls guided in windows of the cage is substantially determined by the fracture strength of the cage. Between the individual windows accommodating the balls there are provided webs which, for design and geometric reasons, cannot be reinforced by just any amount.

It is the object of the present invention to provide a cage for a constant velocity universal joint in the case of which the fracture strength of the cage is increased without restricting the freedom of movement of the joint.

In accordance with the invention, the objective is achieved in that the circumferentially extending contact faces for the balls at the windows are aligned in such a way that, at least in the center plane of the cage, their radial extensions are tangent or contact a sphere virtually arranged at the point of intersection between the radial center plane of the cage and the joint axis, and that the diameter of the sphere approximately corresponds to the diameter of the balls held in the cage.

The advantage of the cage embodiment in accordance with the present invention is that the strength of the individual webs of the cage is substantially increased by increasing the cross-section of the web. This is of particular significance in that it is the webs which determine the fracture strength of the cage when subjected to loads.

According to a method of producing the cage in accordance with the present invention it is proposed that during a first punching operation, a machining allowance is taken into account, that finish-machining is undertaken by a tool which is pivotable around the longitudinal axis of the cage and that the finish-machining operation is followed by a surface treatment or hardening operation.

The advantage of the method described is that the cage production costs are not increased.

In this case, the finish-machining operation used in conventional production processes is replaced by a milling or grinding operation.

The surface treatment following the finish-machining operation does not have to be followed by any further machining operations.

According to a further embodiment of the present invention, it is proposed that while the tool is stationary, but rotating, the cage is subjected to a pivot movement around its longitudinal axis.

This operation may be carried out by a pivoting device for the cage.

According to an advantageous characteristic of a method for producing a cage for a constant velocity universal joint, the surface treatment of the cage takes place prior to finish-machining the cage.

If grinding constitutes the finish-machining operation, there will be no problems when the surface treatment takes place in advance of the finish-machining operation. But nowadays it is also possible to provide the surface-treated cage with the required shape by carrying out a milling operation.

BRIEF DESCRIPTION OF THE DRAWINGS

Below, the invention will be explained in greater detail with reference to an embodiment illustrated in the drawing wherein.

Figure 1:
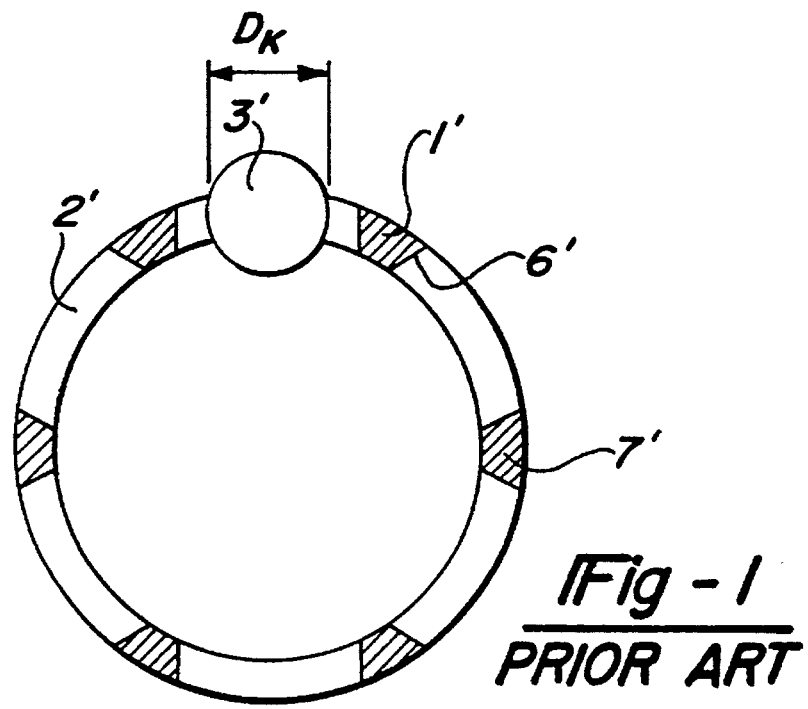
FIG. 1 is a cross-section through a conventional cage.

The cross-section illustrated in FIG. 1 refers to a cage 1' of conventional design. In view of the conventional production process applied, such as punching or broaching, the circumferentially directed contact faces 6' for the balls 3 are arranged so as to extend parallel to one another and parallel to a center plane through the windows 2' of the cage 1'. Only one ball 3 is shown in FIG. 1 with ball 3 having a diameter Dk.

Figure 2:
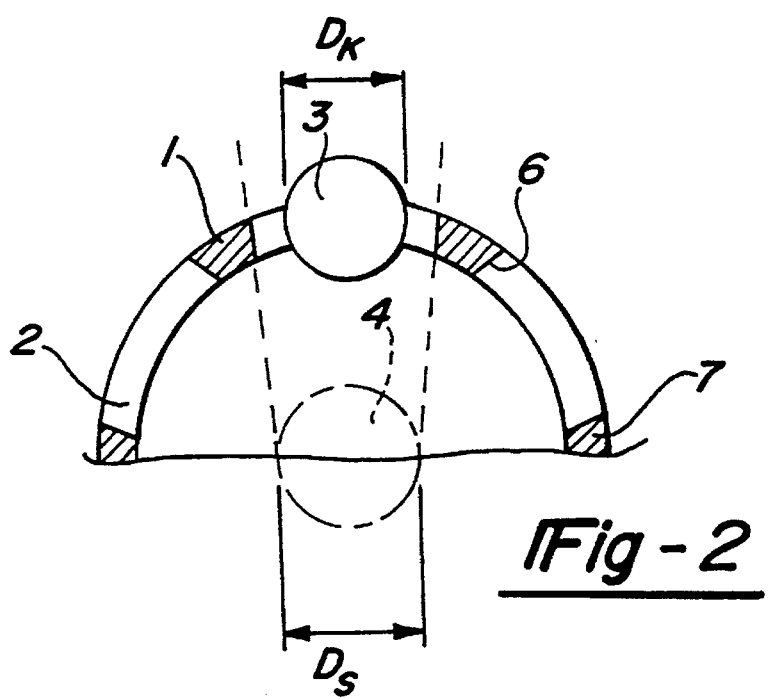
FIG. 2 is half a section through a cage embodiment in accordance with the present invention.

FIG. 2 shows the contact faces 6 of the windows 2 in accordance with the present invention, with the radial extensions of the circumferentially directed contact faces 6, at least in the center plane of the cage 1, tangent to or contacting a sphere 4 virtually arranged at the point of intersection of the radial center plane of the cage and the joint axis and with the diameter DS of the virtually arranged sphere 4 approximately corresponding to the diameter DK of the balls 3 held in the cage. This measure achieves an optimum design for the web 7 without adversely affecting the articulation ability of the joint. Only one ball 3 is shown in FIG. 2 with ball 3 having a diameter Dk.

Figure 3:
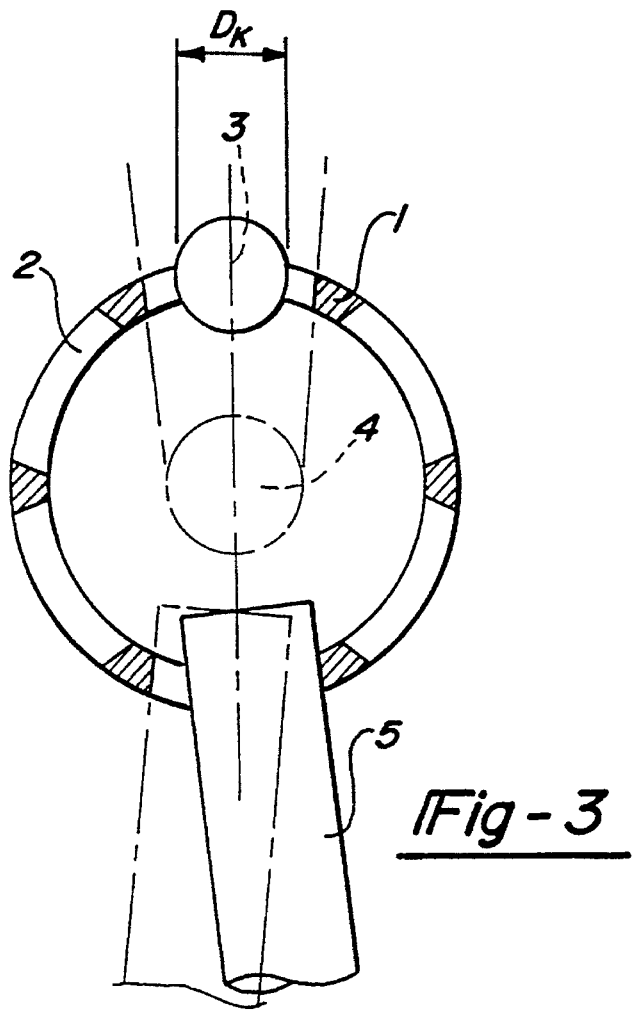
FIG. 3 shows the principle of a possible finish machining operation for the windows.

FIG. 3 shows a tool 5 engaging a window 2 of the cage 1. The tool 5 may be provided in the form of a grinding pin or a shank-type milling tool.

Figure 4:
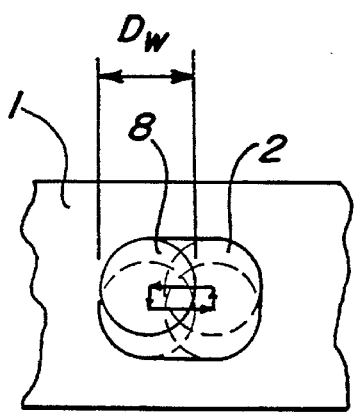
FIG. 4 is a side view of the cage with a tool whose diameter is smaller than that of the accommodated balls.

FIG. 4 shows a finish-machining tool 8 whose diameter DW is smaller than that of the balls 3 held in the cage 1.

Figure 5:
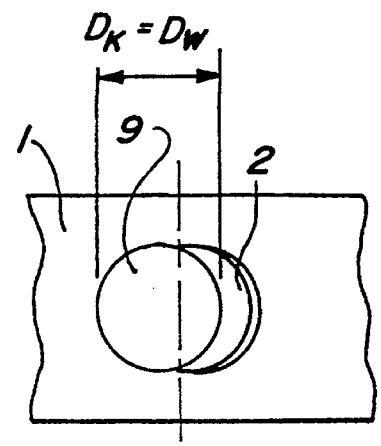
FIG. 5 is a side view of a finish-machining tool whose diameter corresponds to the ball diameter.

FIG. 5 illustrates a tool 9 engaging a window 2 of a cage 1, with the tool diameter Dw corresponding to the finish dimension of window 2 which in some designs is the diameter Dk of the balls 3 held in the windows 2.

Figure 7:
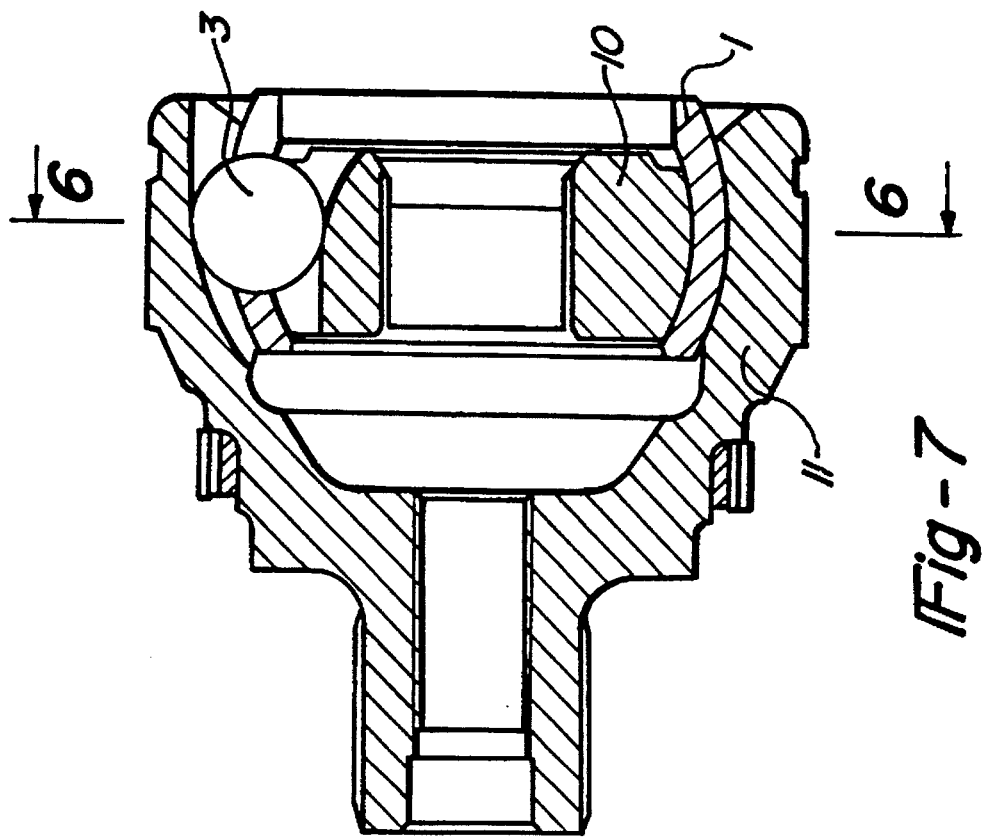
FIG. 7 is a cross-section through a typical universal joint taken in the direction of arrows 7—7 shown in FIG. 6 without having the spherical ball in section.
Figure 6:
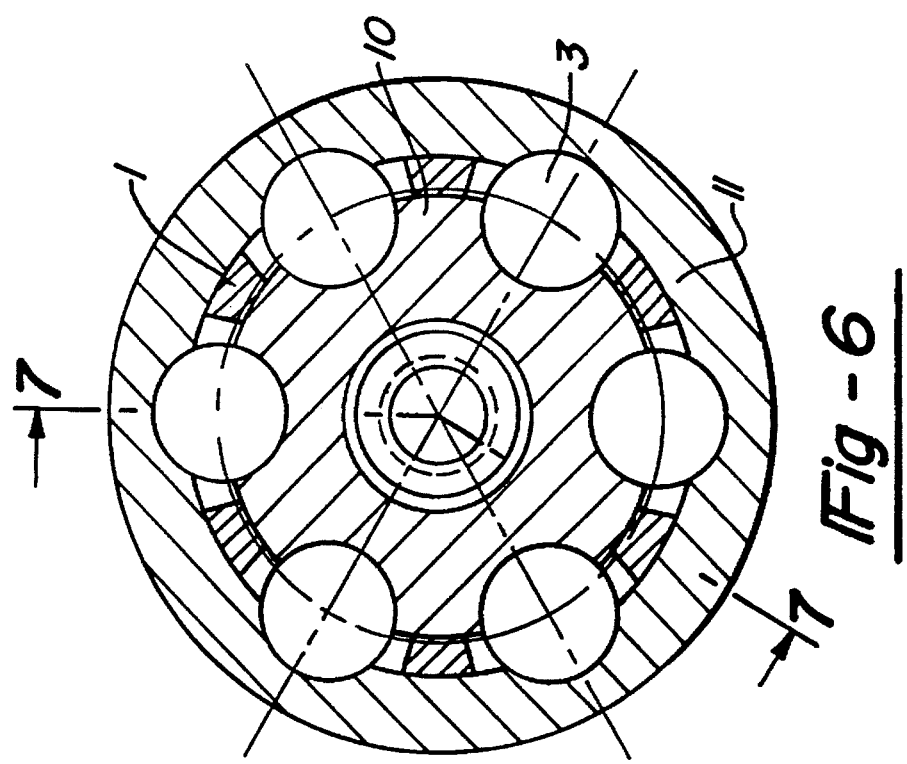
FIG. 6 is a cross-section through a typical universal joint taken in the direction of arrows 6—6 shown in FIG. 7 without having the spherical balls in section.

FIGS. 6 and 7 show a ball-type fixed universal joint showing the assembled relationship of cage 1', balls 3, an inner joint member 10 and an outer joint member 11.

What is claimed is:

1. A universal joint defining a joint axis, said joint comprising:

an outer joint member defining an internal cavity having a plurality of outer running grooves;

an inner joint member disposed within said internal cavity, said inner joint member having a plurality of inner running grooves corresponding with said plurality of outer running grooves;

a plurality of balls, each ball defining a ball diameter and being disposed within a respective inner and outer running groove;

a cage disposed within said internal cavity having a central cross sectional plane and a plurality of windows corresponding with said plurality of outer and inner running grooves, each of said plurality of balls being disposed in one of said plurality of windows, each of said windows having side walls, said side walls of said windows being aligned such that a radial extension of said sidewalls in cross section is tangent to a sphere having a sphere center disposed at an intersection of said central cross sectional plane of said cage and said joint axis, said sphere having a diameter generally equal to said ball diameter.

* * * * *